US009123227B2

(12) United States Patent
Kubinski et al.

(10) Patent No.: US 9,123,227 B2
(45) Date of Patent: Sep. 1, 2015

(54) SYSTEM FOR CHECKING SECURITY OF VIDEO SURVEILLANCE OF AN AREA

(75) Inventors: Ronald A. Kubinski, Mission Viejo, CA (US); Robert J. Atmur, Whittier, CA (US); Barbara Park, Diamond Bar, CA (US)

(73) Assignee: The Boeing Company, Chicago, IL (US)

( * ) Notice: Subject to any disclaimer, the term of this patent is extended or adjusted under 35 U.S.C. 154(b) by 1790 days.

(21) Appl. No.: 12/250,315

(22) Filed: Oct. 13, 2008

(65) Prior Publication Data

US 2010/0091108 A1 Apr. 15, 2010

(51) Int. Cl.

| | |
|---|---|
| ***H04N 7/18*** | (2006.01) |
| ***G08B 29/04*** | (2006.01) |
| ***G08B 13/196*** | (2006.01) |
| ***G08B 15/00*** | (2006.01) |
| *G06K 9/00* | (2006.01) |

(52) U.S. Cl.

CPC ............ *G08B 29/046* (2013.01); *G08B 13/196* (2013.01); *G08B 13/19628* (2013.01); *G08B 15/008* (2013.01); *G06K 9/00624* (2013.01)

(58) Field of Classification Search

CPC .......................... G08B 13/196; G06K 9/00624

USPC ................ 348/14.01, 36, 143, 148, 155, 159, 348/211.99; 725/105; 713/201; 370/315; 380/228

See application file for complete search history.

(56) References Cited

U.S. PATENT DOCUMENTS

| | | | | |
|---|---|---|---|---|
| 3,740,466 | A * | 6/1973 | Marshall et al. | 348/154 |
| 4,774,570 | A * | 9/1988 | Araki | 348/154 |
| 5,517,236 | A * | 5/1996 | Sergeant et al. | 348/143 |
| 6,392,692 | B1 * | 5/2002 | Monroe | 348/143 |
| 6,462,774 | B1 * | 10/2002 | Bildstein | 348/143 |
| 6,675,386 | B1 * | 1/2004 | Hendricks et al. | 725/105 |
| 6,698,021 | B1 * | 2/2004 | Amini et al. | 725/105 |
| RE38,908 | E * | 12/2005 | Ho et al. | 348/154 |
| 7,051,356 | B2 * | 5/2006 | Weinstein | 725/105 |
| 7,508,941 | B1 * | 3/2009 | O'Toole et al. | 380/228 |
| 2001/0050709 | A1 * | 12/2001 | Samejima et al. | 348/143 |
| 2002/0030734 | A1 * | 3/2002 | Smith | 348/36 |
| 2003/0107648 | A1 * | 6/2003 | Stewart et al. | 348/143 |
| 2003/0163826 | A1 * | 8/2003 | Weinstein | 725/105 |
| 2003/0169171 | A1 * | 9/2003 | Strubbe et al. | 340/573.1 |

(Continued)

OTHER PUBLICATIONS

Francesco Licandro and Giovanni Schembra. 2007. Wireless mesh networks to support video surveillance: architecture, protocol, and implementation issues. EURASIP J. Wirel. Commun. Netw. 2007, 1 (Jan. 2007).*

(Continued)

*Primary Examiner* — Imad Hussain

(74) *Attorney, Agent, or Firm* — Armstrong Teasdale LLP

(57) ABSTRACT

A system for checking security of video surveillance of an area by a plurality of video units includes: (a) a respective signaling unit coupled with each of a respective signaling-equipped video unit among the plurality of video units; and (b) a control unit coupled with each respective video unit of the plurality of video units; the control unit providing an encoding arrangement for use by each respective signaling unit for emitting a predetermined signal. Each respective signaling-equipped video unit is oriented to permit at least one other video unit of the plurality of video units to receive the predetermined signal. The control unit cooperates with the plurality of video units to evaluate received the predetermined signals to effect the checking.

22 Claims, 4 Drawing Sheets

(56) References Cited

U.S. PATENT DOCUMENTS

| | | | | |
|---|---|---|---|---|
| 2003/0169335 | A1* | 9/2003 | Monroe | 348/143 |
| 2004/0080624 | A1* | 4/2004 | Yuen | 348/211.99 |
| 2005/0076236 | A1* | 4/2005 | Stephenson | 713/201 |
| 2006/0143672 | A1* | 6/2006 | Renkis | 725/105 |
| 2006/0170773 | A1* | 8/2006 | Rye et al. | 348/159 |
| 2006/0190419 | A1* | 8/2006 | Bunn et al. | 706/2 |
| 2007/0076094 | A1* | 4/2007 | Dickerson et al. | 348/143 |
| 2007/0182540 | A1* | 8/2007 | Marman | 340/506 |
| 2007/0200914 | A1* | 8/2007 | DuMas et al. | 348/14.01 |
| 2008/0036859 | A1* | 2/2008 | Chang et al. | 348/143 |
| 2008/0084473 | A1* | 4/2008 | Romanowich | 348/135 |
| 2008/0136914 | A1* | 6/2008 | Carlson et al. | 348/155 |
| 2008/0158358 | A1* | 7/2008 | Chanson et al. | 348/148 |
| 2008/0198231 | A1* | 8/2008 | Ozdemir et al. | 348/159 |
| 2008/0240696 | A1* | 10/2008 | Kucharyson | 396/56 |
| 2009/0315991 | A1* | 12/2009 | Renkis | 348/143 |
| 2010/0013628 | A1* | 1/2010 | Monroe | 340/539.18 |
| 2010/0157879 | A1* | 6/2010 | Broad et al. | 370/315 |
| 2014/0184803 | A1* | 7/2014 | Chu et al. | 348/159 |

OTHER PUBLICATIONS

Yin, Hao; Lin, Chuang; Sebastien, Berton; and Chu, Xiaowen; A Novel Secure Wireless Video Surveillance System Based on Intel IXP425 Network Processor; International Workshop on Modeling Analysis and Simulation of Wireless and Mobile Systems ; Montreal Quebec, Canada; pp. 62-69; 2005.

* cited by examiner

SYSTEM FOR CHECKING SECURITY OF VIDEO SURVEILLANCE OF AN AREA

TECHNICAL FIELD

Embodiments described herein are directed to video surveillance systems, and especially to avoiding spoofing or other interference with video surveillance systems.

BACKGROUND

In any security system there may be a risk that the surveillance system may be compromised. Compromise of a video surveillance system may be manifested in false images, interrupted images or other introduction of falsities sometimes referred to by those skilled in the art of video surveillance systems as spoofing. One may use video data to verify that an area is clear such as, by way of example and not by way of limitation, verifying there is a clear path or transport route through a secured area. A representative application for assuring integrity of a video surveillance system may be when seeking to optimize a route for a transporting a weapon system or similarly sensitive cargo through an area under video surveillance. An exemplary surveillance environment may employ compressed data or compressed encoded data or both unencoded and encoded compressed data. RF data sensors, which may include optical sensors, may be used for establishing a predetermined data signature useful for checking integrity of the surveillance system.

There is a need for a system which assures the integrity of video data received from a video surveillance unit such as a video surveillance camera.

Similarly there is a need for a system which provides automatic checking of security video surveillance of an area.

SUMMARY

A system for checking security of video surveillance of an area by a plurality of video units includes: (a) a respective signaling unit coupled with each of a respective signaling-equipped video unit among the plurality of video units; and (b) a control unit coupled with each respective video unit of the plurality of video units; the control unit providing an encoding arrangement for use by each respective signaling unit for emitting a predetermined signal. Each respective signaling-equipped video unit is oriented to permit at least one other video unit of the plurality of video units to receive the predetermined signal. The control unit cooperates with the plurality of video units to evaluate the received predetermined signals to effect the checking.

A method for selecting a transport path through a zone monitored by a plurality of sensor installations, each respective sensor installation of the plurality of sensor installations including a plurality of sensor units, includes: (a) providing a respective signaling unit coupled with each of a respective signaling-equipped sensor unit among the plurality of sensor units in each of the plurality of sensor installations; (b) providing at least one control unit coupled with each respective sensor unit of the plurality of sensor units in each of the plurality of sensor installations; the at least one control unit providing an encoding arrangement for use by each respective signaling unit for emitting a predetermined signal; each respective signaling-equipped sensor unit being oriented to permit at least one other sensor unit of the plurality of sensor units in at least one respective sensor installation of the plurality of sensor installations to receive the predetermined signal; the at least one control unit cooperating with the plurality of sensor units in selected sensor installations of the plurality of sensor installations to evaluate received predetermined signals to check integrity of the transport path; (c) providing at least one predefined criterion for comparison of extant values with sensor data from the at least one sensor unit to evaluate the integrity; and (d) when the integrity is evaluated as less than a predetermined level, taking at least one action; the at least one action including: (1) ceasing progression along an extant the transport path; (2) notifying a predetermined party of an occurrence of integrity being evaluated as less than the predetermined level; (3) initiating further investigation to ascertain whether a maintenance action is required; and (4) proceeding along an alternate the transport path.

It is, therefore, a feature of the present disclosure to provide a system for assuring integrity of video data received from a video surveillance unit such as a video surveillance camera.

It is a further feature of the present disclosure to provide a system that provides automatic checking of security video surveillance of an area.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION

Figure 1:
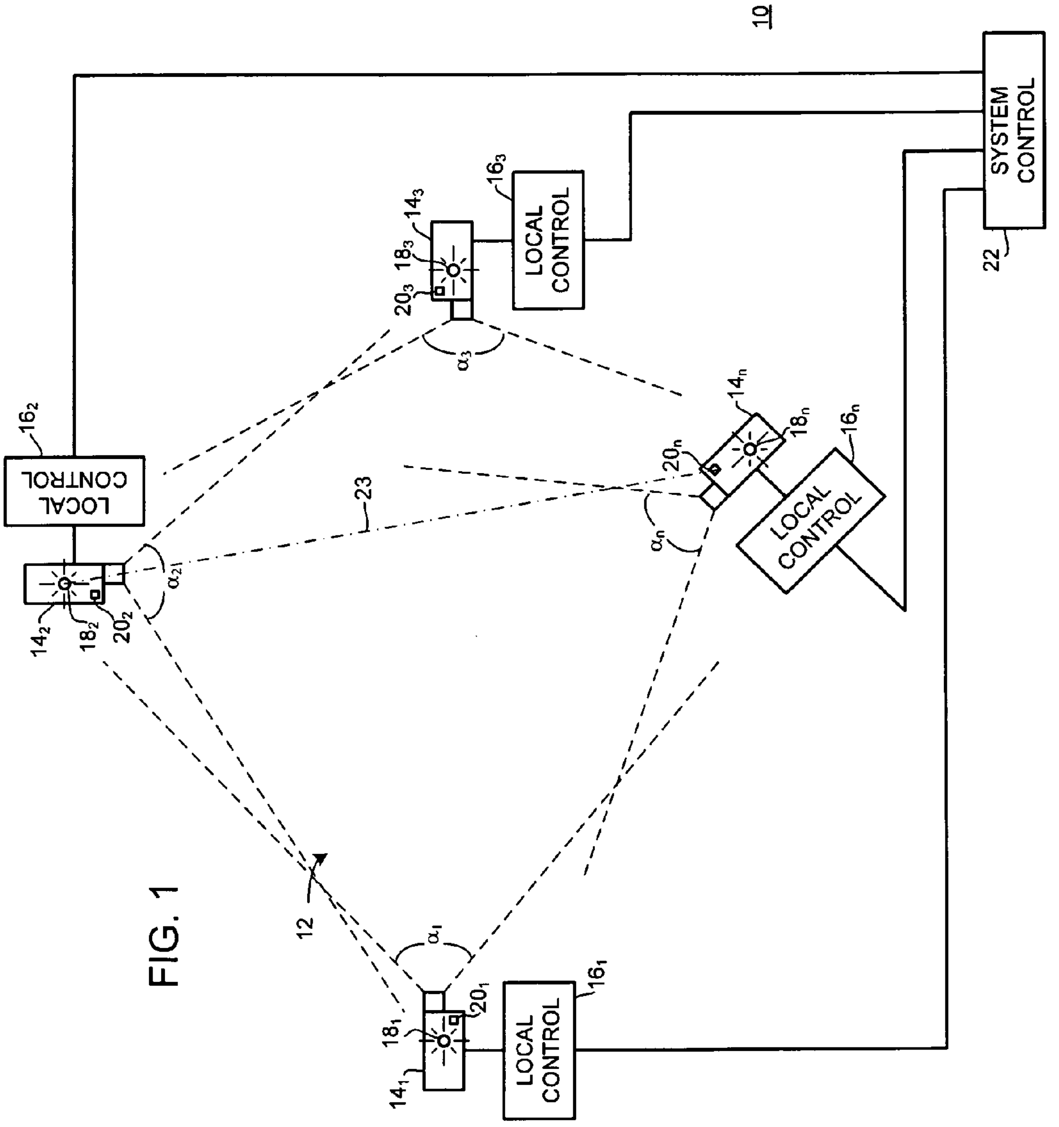
FIG. 1 is a schematic diagram illustrating employment of the present disclosure in a video surveillance system.

FIG. 1 is a schematic diagram illustrating employment of the present disclosure in a video surveillance system. In FIG. 1, a surveillance system 10 may monitor or surveil an area 12. Surveillance system 10 may include a plurality of video units $\mathbf{14}_1$, $\mathbf{14}_2$, $\mathbf{14}_3$, $\mathbf{14}_n$. The indicator "n" is employed to signify that there can be any number of video units in surveillance system 10. The inclusion of four video units $\mathbf{14}_1$, $\mathbf{14}_2$, $\mathbf{14}_3$, $\mathbf{14}_n$ in FIG. 1 is illustrative only and does not constitute any limitation regarding the number of video units that may be included in the surveillance system of the present disclosure.

Each video unit $\mathbf{14}_n$ may have an associated local control unit $\mathbf{16}_n$ so that video unit $\mathbf{14}_1$ may be coupled with a local control unit $\mathbf{16}_1$, video unit $\mathbf{14}_2$ may be coupled with a local control unit $\mathbf{16}_2$, video unit $\mathbf{14}_3$ may be coupled with a local control unit $\mathbf{16}_3$ and video unit $\mathbf{14}_n$ may be coupled with a local control unit $\mathbf{16}_n$.

Each video unit $\mathbf{14}_n$ may also have an associated signaling unit $\mathbf{18}_n$ so that video unit $\mathbf{14}_1$ may be coupled with a signaling unit $\mathbf{18}_1$, video unit $\mathbf{14}_2$ may be coupled with a signaling unit $\mathbf{18}_2$, video unit $\mathbf{14}_3$ may be coupled with a signaling unit $\mathbf{18}_3$ and video unit $\mathbf{14}_n$ may be coupled with a signaling unit $\mathbf{18}_n$.

Each video unit $\mathbf{14}_n$ may also have an associated detector or receiving unit $\mathbf{20}_n$ so that video unit $\mathbf{14}_1$ may be coupled with a receiving unit $\mathbf{20}_1$, video unit $\mathbf{14}_2$ may be coupled with a receiving unit $20_2$, video unit $14_3$ may be coupled with a receiving unit $20_3$ and video unit $14_n$ may be coupled with a receiving unit $20_n$.

Video units $14_1$, $14_2$, $14_3$, $14_n$ may be arranged about area 12 in a manner permitting signals emitted by each signaling unit $18_1$, $18_2$, $18_3$, $18_n$ to be received by at least one receiving unit $20_1$, $20_2$, $20_3$, $20_n$. By way of example and not by way of limitation, receiving unit $20_n$ may be oriented having a having a clear line-of-sight 23 with signaling unit $18_2$.

Each respective video unit $14_n$ may have an associated sensor such as, by way of example and not by way of limitation, a radio frequency (RF) sensor, an infrared (IR) sensor, an acoustic sensor, a thermal sensor or another sensor known to those skilled in the art of surveillance systems in order to effect thorough surveillance of area 12.

A system control unit 22 may be coupled with each respective local control unit $16_n$ to effect overall system control of system 10. Alternately, any one of control units $16_n$ may be configured to, independently or in cooperation with another control unit $16_n$, act as a system control unit in place of system control unit 22.

Control unit 22 may operate to provide an encoding arrangement for use by respective signaling-equipped video units $14_n$ to present or emit a predetermined signal from an associated signaling unit $18_n$. All video units $14_n$ in FIG. 1 are equipped with an associated signaling unit $18_n$, so all video units $14_n$ in FIG. 1 are signaling-equipped video units. Surveillance system 10 may, if desired, include one or more non-signaling-equipped video units (not shown in FIG. 1).

Signaling units $18_n$ may emit a predetermined encoded signal that may be received by one or more receiving units $20_n$. Receiving units $20_n$ that may receive an encoded signal may provide that extant received encoded signal via a local control unit $16_n$ to system control unit 22. System control unit 22, independently or in cooperation with participating local control units $16_n$, may evaluate the received encoded signals vis-a-vis the presented or emitted encoded signal. System control unit 22 may know what encoding is supposed to have been received because system control unit 22 provided the encoding scheme to signaling units $18_n$. Differences between received signals and emitted signals may indicate a likelihood that the involved video unit $14_n$ has been tampered with or, as those skilled in the art of video surveillance term it, has been spoofed.

While light has been illustrated as the medium by which encoded signals may be transmitted from signaling units $18_n$, the medium by which encoded signals may be transmitted from signaling units $18_n$ may be any medium appropriate for the application including, by way of example and not by way of limitation, one or more of a light signal, a radio frequency signal and a sound signal.

Encoding arrangements provided for use in creating predetermined signal for emission by signaling units $18_n$ may include, by way of example and not by way of limitation, varying at least one of a pulse train, polarity, intensity, frequency or another parameter of the signal medium employed. Encoding may further involve variation of or combinations of media employed.

Signaling units $18_n$ may be embodied in light emitting data sources which may be co-located with light-detecting equipment (e.g., cameras; embodied in video units $14_n$) operating as receiving units $20_n$. Light emitting data sources operating as signaling units $18_n$ may emit random sequences of light. Polarization of light may be effected using filtering at a light emission source (e.g., at a signaling unit $18_n$) and using filtering at light detecting equipment (e.g., a receiving unit $20_n$).

Surveillance system 10 may provide continuous integrity data that may contribute to substantially increased security in operation of surveillance system 10. Compressed video data may be advantageously used as encoded predetermined signals, and such compressed encoded data may be employed for effecting desired evaluations without first requiring decompression. Such use of compressed data for evaluation may conserve time and resources that otherwise would be employed to decompress data.

Evaluation of comparison of extant received signals with emitted signals may be performed by a human operator, or may be performed automatically by system control unit 22, alone or in cooperation with one or more local control unit $16_n$. An indication of integrity of video surveillance system 10 may be displayed on a monitor or other viewing device viewable by a human operator (not shown in FIG. 1), if desired, as may be understood by those skilled in the art of surveillance systems. Such a display for a human operator may be employed by the operator to effect comparison of extant received signals with emitted signals, or such a display may be presented as information for the operator.

Figure 2:
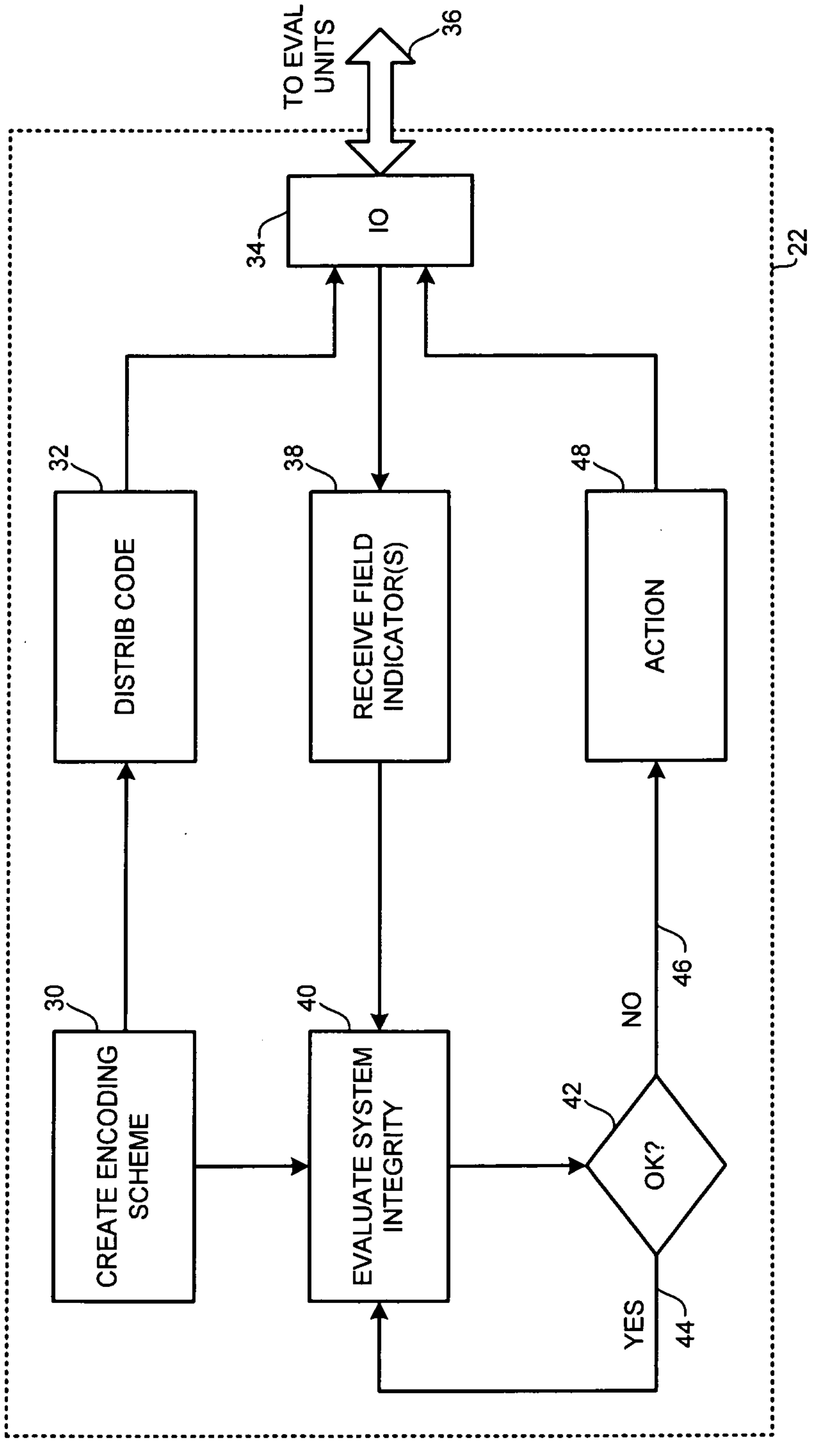
FIG. 2 is a schematic diagram illustrating a control unit useful in the video surveillance illustrated in FIG. 1.

FIG. 2 is a schematic diagram illustrating a control unit useful in the video surveillance illustrated in FIG. 1. In FIG. 2, system control unit 22 may create an encoding scheme in an encoding section 30 and may determine distribution of the encoding scheme among signaling units $18_n$ in surveillance system 10 (FIG. 1) in a code distribution section 32. Code distribution section 32 may cooperate with an input-output (IO) section 34 to provide the encoding scheme to selected signaling units $18_n$ (FIG. 1) as indicated by an arrow 36. Encoding section 30 may also provide encoding schemes to an evaluation section 40.

System control unit 22 may receive information at input-output (IO) section 34 from one or more local control unit $16_n$ (FIG. 1) relating to an encoded signal or field indicators detected or received by a receiving unit $20_n$, as indicated by arrow 36. The received field indicators may be provided to a field indicator receiving section 38. Field indicator receiving section 38 may provide information relating to the received filed indicators to evaluation section 40.

Evaluation section 40 may evaluate whether field indicators received from one or more local control unit $16_n$ are substantially consistent with the encoding scheme created in encoding section 30. Evaluation section 40 may provide a result of that evaluation to a query section 42 at which a query may be posed whether field indicators received from one or more local control unit $16_n$ are substantially consistent with the encoding scheme created in encoding section 30. If field indicators received from one or more local control unit $16_n$ are substantially consistent with the encoding scheme created in encoding section 30, system control unit 22 may proceed from query section 42 via a YES response line to return to evaluation section 40 and continue operation. If, field indicators received from one or more local control unit $16_n$ are not substantially consistent with the encoding scheme created in encoding section 30, system control unit 22 may proceed from query section 42 via a NO response line to an action section 48. Action section 48 may initiate an action in response to the NO response to the query posed by query block 42. An action may include, by way of example and not by way of limitation, one or more of shutting down surveillance system 10 (FIG. 1), presenting an alarm to operators of surveillance system 10 indicating an aberration in operation of one or more video unit $14_n$ or another action deemed appropriate for the anomaly detected between the field indicators received from one or more local control unit $16_n$ and the encoding scheme created in encoding section 30.

Action section 48 may promulgate the action required to surveillance system 10 via IO section 34, as indicated by arrow 36.

Figure 3:
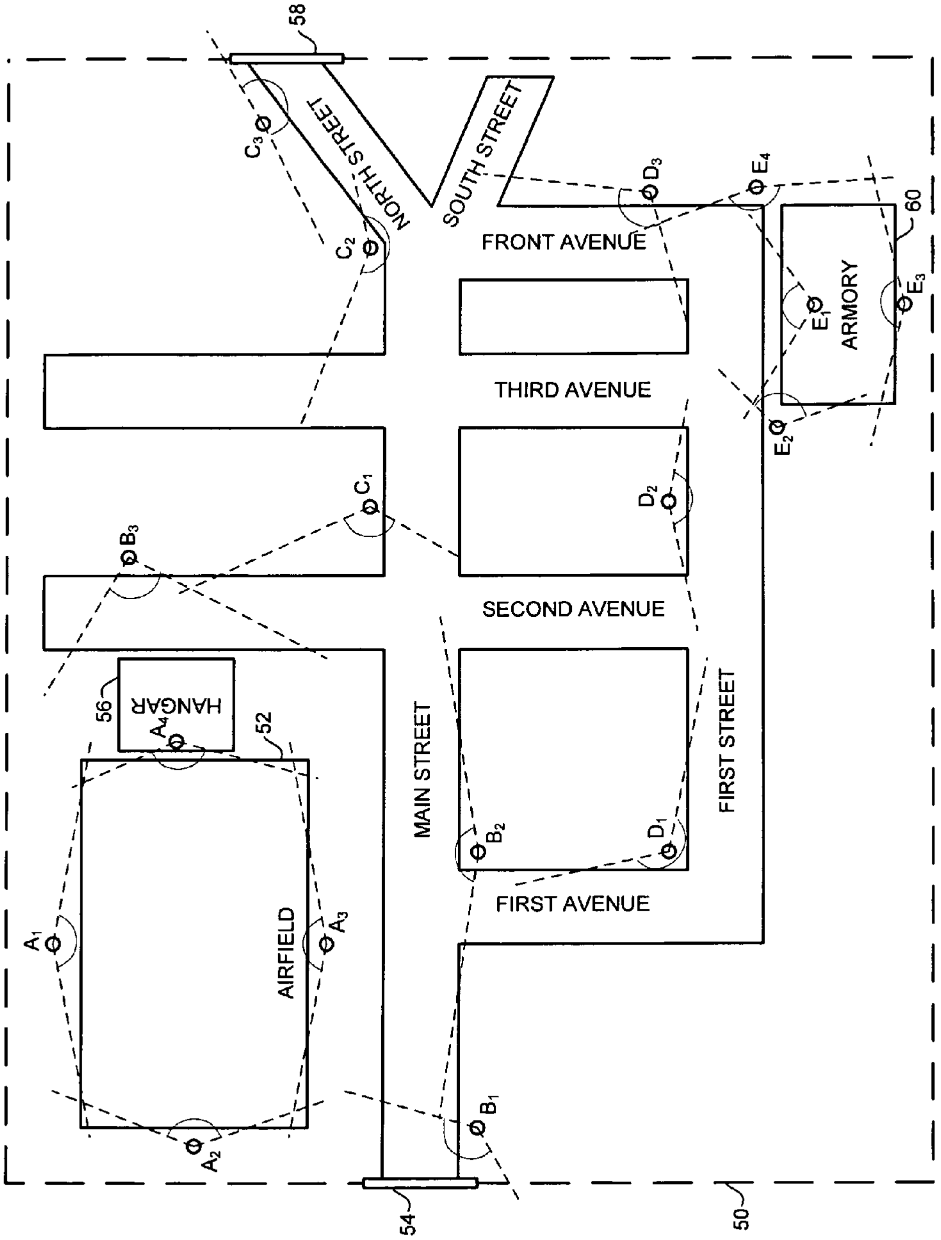
FIG. 3 is a schematic diagram illustrating employment of the present disclosure in selecting a transport path through a zone monitored by a plurality of sensor installations.

FIG. 3 is a schematic diagram illustrating employment of the present disclosure in selecting a transport path through a zone monitored by a plurality of sensor installations. In FIG. 3, a zone 50 may be embodied, by way of example and not by way of limitation, in a military base. Zone 50 may include a plurality of sensor installations monitoring a plurality of portions of zone 50. By way of example and not by way of limitation, zone 50 may have a portion such as an airfield 52 monitored by a plurality of sensors $A_1, A_2, A_3, A_4$ (hereinafter collectively referred to as "A Sensors"). Zone 50 may have a portion such as an area ranging from a front gate 54 along Main Street and a length of Second Avenue facing a hangar 56 abutting airfield 52 monitored by a plurality of sensors $B_1$, $B_2$, $B_3$ (hereinafter collectively referred to as "B Sensors"). Zone 50 may have a portion such as an area ranging from the intersection of Main Street and Second Avenue along Main Street and North Street to a rear gate 58 monitored by a plurality of sensors $C_1$, $C_2$, $C_3$ (hereinafter collectively referred to as "C Sensors"). Zone 50 may have a portion such as an area ranging from the intersection of Main Street and Front Avenue along Front Avenue, First Street and First Avenue to Main Street monitored by a plurality of sensors $D_1$, $D_2$, $D_3$ (hereinafter collectively referred to as "D Sensors"). Zone 50 may have a portion such as an area including an Armory 60 at the intersection of Front Avenue and First Street monitored by a plurality of sensors $E_1$, $E_2$, $E_3$, $E_4$ (hereinafter collectively referred to as "E Sensors").

A Sensors, B Sensors, C Sensors, D Sensors and E Sensors may include video units and may further include additional sensors such, as by way of example and not by way of limitation, radio frequency (RF) sensors, infrared (IR) sensors, acoustic sensors, thermal sensors and other sensors responsive to other stimuli or combinations of stimuli.

Each respective sensor may be coupled with a respective local control unit (e.g., local control unit 16$_n$; FIG. 1). Each respective sensor group (i.e., A Sensors, B Sensors, C Sensors, D Sensors and E Sensors) may be coupled with a respective control unit (e.g., control unit 22; FIG. 1).

At least one sensor unit in zone 50 may operate as a signaling sensor to emit a predetermined encoded signal. A single signaling sensor emitting such a predetermined signal may be adequate so long as at least one sensor unit in the signaling sensor's group and at least one signal in each other group may "see" or sense the predetermined signal. Security may be increased with more sensors acting as signaling sensors. If each sensor unit in each sensor group may emit a predetermined encoded signal readable or receivable by each other sensor in the sensor group, security may be significantly enhanced.

One may plan a route through zone 50 to deliver a cargo from an aircraft landing at airfield 52, via hangar 56 to armory 60. During planning of the route from hangar 56 to armory 60 one may establish predefined criteria for comparison of en route extant values of sensor data such as by way of example and not by way of limitation, predetermined signals emitted from sensors in sensor groups encountered along the chosen route. If extant values are other than predetermined values, one may conclude that integrity of security along the chosen route may be compromised or reduced. Such a lower-than-expected extant value may indicate that one or more security sensor may have been spoofed or otherwise compromised.

Thus, if one is traversing a route, by way of example and not by way of limitation, from hangar 56 en route to armory 60 along Second Avenue, Main Street and Front Avenue one may expect to sense certain predetermined signals from A Sensors in the vicinity of airfield 52 and hangar 56, B Sensors in the vicinity of hangar 56 and Second Avenue, C Sensors from the intersection of Main Street and Second Avenue along Front Avenue, D Sensors along Front Avenue to armory 60 at First Street and E Sensors in the vicinity of armory 60.

If extant signals may be sensed from any sensors along the route that are other than the predetermined expected signals, the party responsible for the transport operation may take one or more of the following actions: (1) cease the transport operation along the transport path, (2) notify a predetermined party (e.g., a security force) of an occurrence of integrity being evaluated as less than a predetermined level, (3) initiating a further investigation to ascertain whether a maintenance action is required and (4) proceeding along an alternate transport path.

Transport along roadways is illustrated in FIG. 3. However, transport via railways, monorails, overhead lifts, conveyor systems and other transport traversing a zone monitored by sensor installations may advantageously employ the present disclosure.

Figure 5:
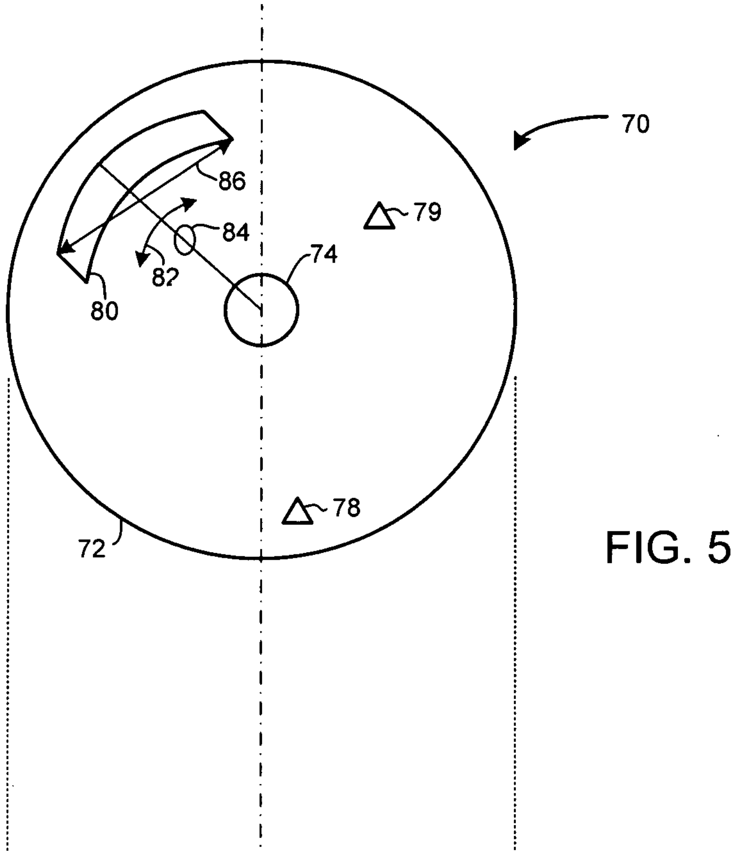
FIG. 5 is a top view of the mirror fixture illustrated in FIG. 4.
Figure 4:
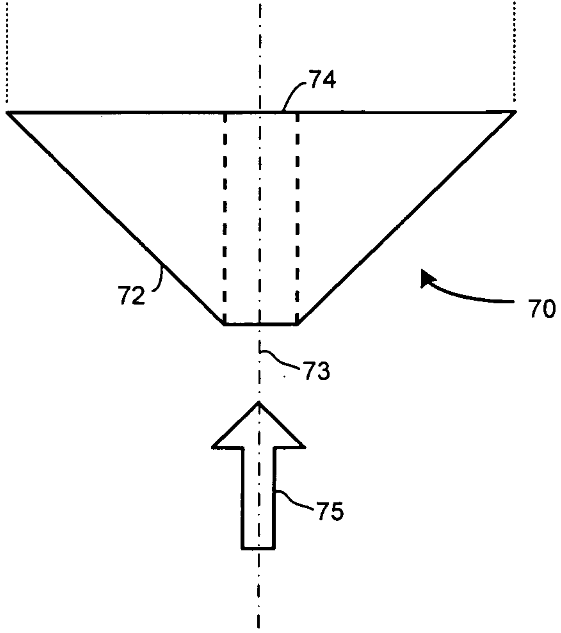
FIG. 4 is a side view of a representative mirror fixture useful in implementing the present disclosure.

FIG. 4 is a side view of a representative mirror fixture useful in implementing the present disclosure. FIG. 5 is a top view of the mirror fixture illustrated in FIG. 4. Referring to FIGS. 4 and 5 together, a mirror assembly 70 may include a generally conical mirror 72 carried on a support structure or post 74 oriented substantially about an axis 73. A video unit (such as a video camera 14$_n$; FIG. 1—not shown in FIGS. 4 and 5) may be oriented to "look" toward mirror 72 substantially along axis 73 as indicated by an arrow 74. Such an orientation looking along axis 73 may provide a fixed video unit with a 360 degree view of an area surrounding mirror 72. There may be no need to physically rotate the video unit to achieve a 360 degree field of view.

Each stationary camera may be mounted on post 74 and coupled with a local control unit (16$_n$; FIG. 1—not shown in FIGS. 4 and 5) that provides power and a camera controller to operate under a predefined protocol between the local control unit and a security element (i.e., ground system computer; central control unit 22; FIG. 1—not shown in FIGS. 4 and 5).

Mirror 72 may be fixed above the camera to provide a field of view for the camera. Each camera may have a second or third camera in its field of view (see, for example, FIGS. 1 and 3). That is, a camera mounted on post 74 may have a second camera in its view at a location 78 and may have a third camera in its view at a location 79. Simply from being situated within each other's field of view, a given camera may detect physical tampering with a neighboring camera within sight. Such overlapping camera visual coverage may also provide redundancy for the area under surveillance because if one camera is not operational, a second or a third camera may provide coverage. Each camera may use its respective mirror 72 to record its entire 360 degree field of view at all times.

A system (e.g., system 10; FIG. 1) may implement any number of data compression techniques on the image data to minimize bandwidth utilization. Camera movement operations such as pan, tilt and zoom operations may simulate camera action but may in reality be performed on the mirrored image and may not affect the camera's field of view. That is, a camera mounted on post 74 may perform pan 82, tilt 84 and zoom 86 operations on an image of an object appearing in a field 80 within its view on mirror 72 without having to move to aim at the object itself. Alternately, operations such as pan, tilt and zoom may be performed by a control unit (e.g., a local control unit 16$_n$ or system control unit 22; FIG. 1) using an image already received by employing delayed image processing techniques.

The entire field of view of a camera may always be transmitted and a secondary control line (not shown; known to those skilled in the art of video surveillance systems) may transmit only a pan/tilt/zoom image that may be requested.

A control unit (e.g., a local control unit $\mathbf{16}_n$ or system control unit 22; FIG. 1) may initiate a request for integrity verification at any time. The system may periodically perform integrity verification from each camera. A local control unit (e.g., $\mathbf{16}_n$; FIG. 1) may receive a request for an integrity verification or may automatically initiate a request for the integrity verification based upon a predetermined schedule or based upon satisfying other criteria. Determinations of good or potentially spoofed systems (i.e., status) may be reported to security personnel.

A fixed security key may be predefined for integrity verification or for communications among units in a system (e.g., system 10; FIG. 1). A security key may be synchronized between a system control unit (e.g., system control unit 22; FIG. 1) and a local control unit (e.g., a local control unit $\mathbf{16}_n$; FIG. 1) using some predefined protocol. Each local control unit may have a unique security key. A security key may change at some periodic interval (e.g., every minute, hour, day, week or a variable interval). A security key may be an encoded signal (e.g., light frequency, pulse sequence or a combination of light frequency and pulse sequence) that may be measured. A security key may be a "phrase" that may be detected (e.g., date-time, security key, or a similar phrase).

Post 74 may provide a mount for a light source that may provide flash sequences based on a predefined security key. A second camera may capture the light flash emitted by a light source associated with a first camera. Data may be sent to a system control unit (e.g., system control unit 22; FIG. 1) for verification.

A camera controller such as a local control unit $\mathbf{16}_n$ (FIG. 1) may overlay a predefined security key on a portion of a display such as a corner of an image transmitted to a system control unit (e.g., system control unit 22; FIG. 1). Upon receipt of the image, the system control unit may verify presence of the proper security key at an expected display location. A security key may be a fixed location in a field of view such as, by way of example and not by way of limitation, a railway track, another camera, a building or another structure. The image of an appropriate structure in an appropriate location may be transmitted to a system control unit based on a security key in effect at the time of the transmission. Upon receipt of the image, a system control unit may verify receipt of a proper security key.

Using substantially the same integrity verification methods an integrity verification may be performed using sensors other than a video camera even though a sensor may not have the same operational environment as a stationary camera. That is, a sensor may not be stationary, a sensor may not be attached to a post or other structure and a sensor may not have a second or third sensor in its field of view.

It is to be understood that, while the detailed drawings and specific examples given describe preferred embodiments of the disclosure, they are for the purpose of illustration only, that the apparatus and method of the disclosure are not limited to the precise details and conditions disclosed and that various changes may be made therein without departing from the spirit of the disclosure which is defined by the following claims:

We claim:

1. A system for checking security of video surveillance of an area, the system comprising:

a plurality of video units, each of the plurality of video units comprising a respective signaling unit and a respective receiving unit; and a control unit coupled with each respective video unit of said plurality of video units, said control unit providing an encoding arrangement for use by each said respective signaling unit for emitting a predetermined encoded signal;

wherein each of the respective receiving units are oriented to receive an encoded signal from at least one other video unit of said plurality of video units, and wherein a respective control unit of said receiving unit compares said received encoded signal with said predetermined encoded signal to determine if the encoded signal matches the predetermined encoded signal.

2. A system for checking security of video surveillance of an area by a plurality of video units as recited in claim 1 wherein said predetermined encoded signal is embodied in a light signal.

3. A system for checking security of video surveillance of an area by a plurality of video units as recited in claim 2 wherein said encoding arrangement includes varying at least one of a pulse train, polarity, intensity, frequency or another parameter associated with said light signal.

4. A system for checking security of video surveillance of an area by a plurality of video units as recited in claim 1 wherein said predetermined encoded signal is embodied in at least one of a light signal, a radio frequency signal and a sound signal.

5. A system for checking security of video surveillance of an area by a plurality of video units as recited in claim 4 wherein said encoding arrangement includes varying at least one of a pulse train, polarity, intensity, frequency, volume, pattern and another parameter associated with said predetermined encoded signal.

6. A system for checking security of video surveillance of an area, the system comprising:

a plurality of video units, each of the plurality of video units comprising a respective signaling unit and a respective receiving unit; and at least one control unit coupled with each respective video unit of said plurality of video units, said at least one control unit providing an encoding arrangement for use by each said respective signaling unit for emitting a predetermined encoded signal;

wherein each of the respective receiving units are oriented to receive an encoded signal in a compressed video from at least one other video unit of said plurality of video units and wherein a respective control unit of said receiving unit compares the received encoded signal in the compressed video with said predetermined encoded signal to determine if the encoded signal matches the predetermined encoded signal.

7. A system for checking security of video surveillance of an area by a plurality of video units as recited in claim 6 wherein said predetermined encoded signal is embodied in a light signal.

8. A system for checking security of video surveillance of an area by a plurality of video units as recited in claim 7 wherein said encoding arrangement includes varying at least one of a pulse train, polarity, intensity, frequency or another parameter associated with said light signal.

9. A system for checking security of video surveillance of an area by a plurality of video units as recited in claim 6 wherein said predetermined encoded signal is embodied in at least one of a light signal, a radio frequency signal and a sound signal.

10. A system for checking security of video surveillance of an area by a plurality of video units as recited in claim 9 wherein said encoding arrangement includes varying at least one of a pulse train, polarity, intensity, frequency, volume, pattern and another parameter associated with said predetermined encoded signal.

11. A system for checking security of video surveillance of an area by a plurality of video units as recited in claim 6 wherein said at least one control unit comprises a respective control unit associated with each respective said video installation of said plurality of video installations.

12. A system for checking security of video surveillance of an area by a plurality of video units as recited in claim 6 wherein at least one first selected control unit of said at least one control unit is associated with a respective said video installation of said plurality of video installations and wherein at least one second selected control unit of said at least one control unit is associated with at least two respective said video installations of said plurality of video installations.

13. A system for checking security of video surveillance of an area by a plurality of video units as recited in claim 11 wherein said at least one control unit includes a master control unit coupled with each said respective control unit associated with each respective said video installation of said plurality of video installations.

14. A system for checking security of video surveillance of an area by a plurality of video units as recited in claim 12 wherein said at least one control unit includes a master control unit coupled with each respective said at least one first selected control unit and coupled with each respective said at least one second selected control.

15. A system for checking security of video surveillance of an area by a plurality of video units as recited in claim 13 wherein said predetermined encoded signal is embodied in at least one of a light signal, a radio frequency signal and a sound signal.

16. A system for checking security of video surveillance of an area by a plurality of video units as recited in claim 15 wherein said encoding arrangement includes varying at least one of a pulse train, polarity, intensity, frequency, volume, pattern and another parameter associated with said predetermined encoded signal.

17. A method for selecting a transport path through a zone monitored by a plurality of sensor installations, the method comprising:
- providing a plurality of sensor units, each of the plurality of sensor units comprising a respective signaling unit and a respective receiving unit;
- providing at least one control unit coupled with each respective sensor unit of said plurality of sensor units, said at least one control unit providing an encoding arrangement for use by each said respective signaling unit for emitting a predetermined encoded signal, wherein each of the respective receiving units are oriented to receive an encoded signal from at least one other sensor unit of said plurality of sensor units, and wherein a respective control unit of said receiving unit compares the received predetermined encoded signals to check integrity of said transport path;
- providing at least one predefined criterion for comparison of said received encoded signal with said predetermined encoded signal to evaluate said integrity; and
- when said integrity is evaluated as less than a predetermined level, taking at least one action, said at least one action including:
  - ceasing progression along an extant said transport path;
  - notifying a predetermined party of an occurrence of integrity being evaluated as less than said predetermined level;
  - initiating further investigation to ascertain whether a maintenance action is required; and
  - proceeding along an alternate said transport path.

18. A method for selecting a transport path through a zone monitored by a plurality of sensor installations as recited in claim 17 wherein said at least one control unit comprises a respective control unit associated with each respective said video installation of said plurality of video installations and a master control unit coupled with each said respective control unit.

19. A method for selecting a transport path through a zone monitored by a plurality of sensor installations as recited in claim 18 wherein said predetermined encoded signal is embodied in at least one of a light signal, a radio frequency signal and a sound signal.

20. A method for selecting a transport path through a zone monitored by a plurality of sensor installations as recited in claim 19 wherein said encoding arrangement includes varying at least one of a pulse train, polarity, intensity, frequency, volume, pattern and another parameter associated with said predetermined encoded signal.

21. A system for checking security of video surveillance of an area, the system comprising:
- a plurality of video units, each of the plurality of video units comprising a signaling unit and a receiving unit; and
- a control unit coupled with each respective video unit of said plurality of video units, said control unit providing an encoding arrangement for use by each said respective signaling unit for emitting a predetermined encoded signal;
- wherein each of the respective receiving units are oriented to receive an encoded signal from at least one other video unit of said plurality of video units, wherein a respective control unit of said receiving unit compares said received encoded signal with said predetermined encoded signal to determine if the encoded signal matches the predetermined encoded signal, wherein said predetermined encoded signal is embodied in at least one of a light signal, a radio frequency signal and a sound signal, and wherein said encoding arrangement includes varying at least one of a pulse train, polarity, intensity, frequency, volume, pattern and another parameter associated with said predetermined encoded signal.

22. A method for selecting a transport path through a zone monitored by a plurality of sensor installations the method comprising:
- providing a plurality of sensor units, each of the plurality of sensor units comprising a respective signaling unit and a respective receiving unit;
- providing at least one control unit coupled with each respective sensor unit of said plurality of sensor units, said at least one control unit providing an encoding arrangement for use by each said respective signaling unit for emitting a predetermined encoded signal, wherein each of the respective receiving units are oriented to receive an encoded signal from at least one other sensor unit of said plurality of sensor units, and wherein a respective control unit of said receiving unit compares the received predetermined encoded signal signals to check integrity of said transport path;
- providing at least one predefined criterion for comparison of said received encoded signal with said predetermined encoded signal to evaluate said integrity; and when said integrity is evaluated as less than a predetermined level, taking at least one action, said at least one action including:

ceasing progression along an extant said transport path;

notifying a predetermined party of an occurrence of integrity being evaluated as less than said predetermined level;

initiating further investigation to ascertain whether a maintenance action is required; and proceeding along an alternate said transport path, said at least one control unit comprising a respective control unit associated with each video unit and a master control unit coupled with each said respective control unit;

said predetermined encoded signal being embodied in at least one of a light signal, a radio frequency signal and a sound signal, said encoding arrangement including varying at least one of a pulse train, polarity, intensity, frequency, volume, pattern and another parameter associated with said predetermined encoded signal.

* * * * *